United States Patent Office 3,397,563
Patented Aug. 20, 1968

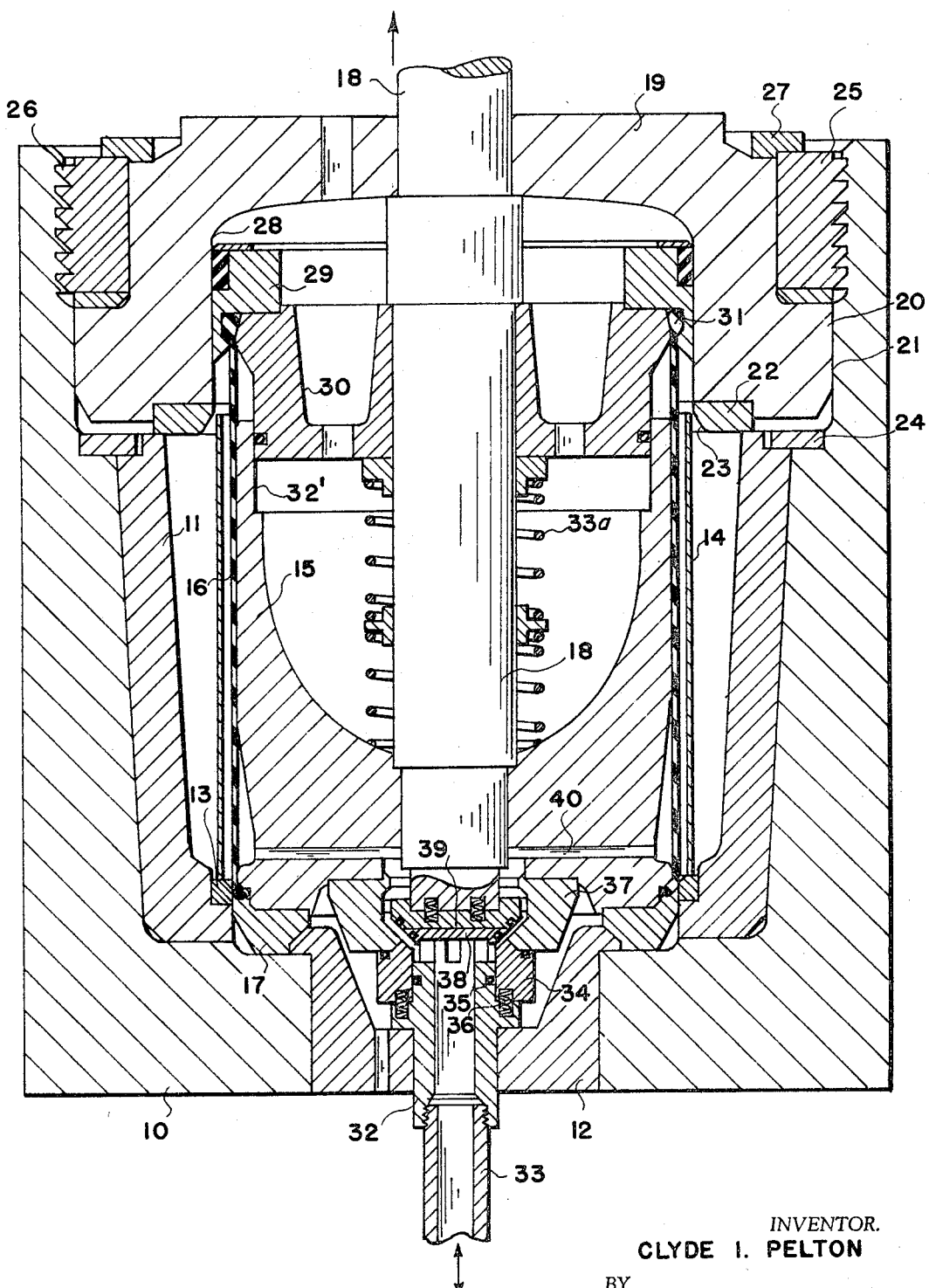

3,397,563
APPARATUS FOR EXPANDING AND FORMING TUBULAR WORKPIECES
Clyde I. Pelton, Warren, Ohio, assignor to The Taylor-Winfield Corporation, Warren, Ohio, a corporation of Ohio
Filed Apr. 20, 1966, Ser. No. 544,006
7 Claims. (Cl. 72—62)

ABSTRACT OF THE DISCLOSURE

Apparatus for forming cylindrical or tubular sheet metal objects by means of a forming die open at one axial end for movement therethrough of a workpiece and expanding mechanism, in loading and unloading, which mechanism comprises telescoping piston-like members closely surrounded by a stretchable sleeve which is radially expandable by the introduction, through one of said members, of fluid under pressure so as to force the tubular sheet metal object against the die. The ends of the sleeve are attached to said piston-like members and spring means are enclosed thereby for yieldably spreading said telescoping members apart to make said stretchable member taut after expansion.

---

This invention relates generally to the metal working art and more particularly to improved apparatus for making various sheet metal products from cylindrical or tubular blanks through the process of expanding the blanks into intimate contact with an annular forming die. Heretofore, this has been accomplished by inserting an expanding mandrel die made up of discrete solid die segments of components into the workpiece and applying heavy expansion forces to stretch the side wall of the blank into intimate contact with the forming surfaces of an external annular die. This process presents many difficulties, not the least of which is the mechanical complexity and cost of the apparatus required but also the tendency of segmented or composite solid dies to impart scratches, die marks, and other irregularities and blemishes to the finished product which if used in an exposed manner requires extensive preparation for final finishing-painting, etc. It is the primary object of this invention to provide a vastly improved and wholly practical device for forming articles from sheet metal cylindrical blanks whereby the product and device has superior dimensional accuracy and form and improved surface character while the device is yet readily adaptable for industrial use at a high rate of production. All this is acomplished by the provision of an improved assembly wherein an expandable sleeve or bladder is inserted in a cylindrical blank which is already positioned in a female annular forming die and wherein extremely high fluid pressures are applied to the interior of the sleeve or bladder to force the sheet metal into precise initimate contact with all the undulations of the internal forming surfaces of the die. The latter may be most accurately machined and highly polished so that, with the absence of any deleterious die marks, etc. imparted by the forming pressure the resultant product is most accurately dimensioned and formed with a superior surface characteristic requiring no smoothing preparation whatever before final coating or finishing.

Another and more specific object of the invention is the provision in apparatus of the general nature outlined above of arrangements whereby the forming cycle may be readily accomplished in an automatic manner and at a high rate of production while requiring a minimum of complexity in the mechanical parts and combinations of the apparatus and wherein the nature of the apparatus and its operational mode are such that little or no wear takes place to require frequent maintenance of the machine.

The above and other objects and advantages of the invention will become apparent upon consideration of the following specification and the accompanying drawing wherein there is disclosed the preferred commercial embodiment of the invention.

The sole figure of the drawing is a vertical or longitudinal section of the essential assembly required to carry out the principles of the invention.

In the drawing, reference numeral 10 designates a massive base or die retainer in which is fitted an annular forming die 11, the base 10 being of sufficient size and strength to contain the enormous expansive forces, which will become apparent below, without deflection or breakage of the die and with an ample factor of safety in the operation of the apparatus. In practice, the retainer 10 will be normally fixed with respect to other supporting elements of the complete machine with which the components shown in the drawing herein will be used.

As shown, the retainer 10 is generally cup-shaped with an enlarged central opening in its bottom wall in which is fitted a heavy ring 12 having a radially outward extending lip on its upper portion to engage the bottom wall of the retainer whereby any tendency of the ring 12 to be extruded downwardly by the heavy fluid forces to be hereinafter mentioned will be excluded. Resting on an internal ledge of the annular die 11 at the inturned bottom end thereof is a ring 13 which receives the bottom edge of the workpiece 14 when the latter is inserted into the die.

Partially receivable within the cylindrical workpiece 14 when the latter is in the die is an expanding mechanism based principally on a piston-like member 15 which has an annular recess extending circumferentially about its bottom edge to receive the lower annular bead of a flexible sleeve or bladder 16, this bead being locked in such recess by a ring 17 which is rigidly attached to the bottom end of the piston 15 by suitable means, not shown. It should be observed that angled interengaging surfaces on the ring 17 and 12 facilitates coincidental alignment of various parts of the assembly and downward guiding of the assembly 15, 17, into the position shown in the drawing, which position is the proper operative position therefor for the beginning of an expanding-forming operation.

The piston-like member 15 is rigidly carried by the bottom end of a rod 18 which, in turn, is suitably connected at its upper end to motive and guide means, not shown herein, whereby it and all the parts carried thereby may be raised and lowered—raised from the lowermost position shown in the drawing to an upper position wherein the lowermost extremity of any part carried by the rod is elevated above the top rim of the retainer 10 to permit this whole movable assembly to be swung or laterally moved to one side of the retainer 10 in the manner more fully suggested in my copending application Ser. No. 543,-970, filed Apr. 20, 1966. Also rigidly carried by the rod 18 is an inverted cup-shaped cap 19 which has an outer cylindrical surface 20 slideably but snugly received in an upper bore 21 of the retainer 10 of somewhat larger diameter than the maximum diameter of the annular die 11. Carried by the bottom end of the cap 19 is a ring die 22 which rests on top the annular die 11 when the assembly is closed, as shown in the drawing, and which has a reduced bottom inner edge 23 to facilitate the bending and wiping of the top edge portion of the workpiece when fluid pressure is applied to the interior of the sleeve 16 to expand the workpiece into intimate contact with the inner exposed surfaces of the annular die 11. This, of course, results in the formation of a small inwardly directed flange on the completed workpiece which is advantageous in providing an anchor for the withdrawal of the formed workpiece from the die, as taught in the aforementioned copending application, but in also reducing any tendency of the sleeve 16 to rupture as it is stretched and forced into the angular interstice between ring 22 and the top portion of die 11. In the drawing, reference numeral 24 designates a retaining ring which is detachably secured to the ledge of the retainer 10 at the bottom of the bore 21 to lock the main forming die in proper position. Upon retraction of the movable section above outlined and removal of the ring 24, the die 11 may be withdrawn upwardly and out of the retainer 10 for ready replacement when changing from one kind or style of product to another.

To lock the cap 19 in closed position and to resist the heavy expansive forces of the high pressure fluid which is introduced into the assembly, I provide a breach locking ring 25 which is rotatably mounted in an annular recess formed in the upper edge of the cap 19. This ring 25 has discontinuous buttress threads 26 which engage with similar threads formed in the upper portion of the bore 21 of the retainer 10, and it will be understood by those familiar with the breach lock principle that rotation of the ring 25 through a predetermined number of degrees will position the arcuate threads 26 in axial slots, not shown herein, formed in the bore 21 whereby the ring 25 as well as the cap 19 may be withdrawn up out of the open end of the retainer 10. A slip ring 27 fixed to the cap 19 holds the ring 25 in properly assembled relation on the cap 19, and in actual practice a cylinder, not shown herein, is used to rotate the ring 25 wtih respect to the cap 19 and the retainer 10 to lock and unlock the cap in position. Of course, such locking and unlocking is accomplished during the sequence of operation of the machine when the fluid pressure is relieved in the apparatus.

Cap 19 is formed with a downwardly opening internal bore 28 which slideably receives a two-part piston comprised of the members 29 and 30, these members having an annular space between them to receive and retain the upper bead 31 of the sleeve 16. It should be further observed that a slidable connection at 32' is provided between the members 30 and 15, a coil spring 33 serving to bias the member 30 upwardly whereby the sleeve 16 will tend to be retained in a longitudinal taut condition. This is of advantage in the cycle of operation of the apparatus as will appear hereinafter.

One of the important aspects of the invention is the provision of an automatic valve which opens when the assembly of the piston 15, 29, 30 and sleeve 16 is lowered into the die 11 to admit fluid pressure into the space within the sleeve and to close such valve when said assembly is about to be retracted in such manner that all air is excluded from the fluid passages and spaces. A heavy fluid fitting 32 is fitted within the ring 12, as shown, and this fitting is castellated at its upper end while being connected at its lower end to a fluid supply and return conduit 33. Slideably mounted on the upper end portion of the fitting 32 is a ring 34 having an annular seal about its upper end and being also sealed from the fitting 32 as by means of the O-ring 35. Ring 34 is biased to upper position—somewhat above that shown in the drawing—by a series of springs 36. The seal on the upper end of the ring 34 is adapted to be closed by a ring 37 which is attached to and moves downwardly with the piston 15.

Rigidly attached to the upper end of the fitting 32 is a disk 38 which has a conical outer surface fitted with a sealing ring to cooperate with a conical seating surface also formed on the upper end of ring 34. Slideably received on the lower end of rod 18 and biased downwardly by the coil spring shown is a second disk 30 having a conical outer surface fitted with a sealing ring, as shown, to coact with a conical seating surface formed in the ring 37.

In the relative positions of the parts shown in the drawing it should be obvious that a fluid passage is provided from the conduit 33 through the upper castellations of the fitting 32, over the conical surfaces of the disks 38 and 39 and to the interior of the sleeve 16 through holes 40 provided in the piston 15 for this purpose. With the workpiece 14 positioned in the die and the cap 19 locked by the breach ring 25, high pressure fluid is now admitted to the conduit 32 and the resultant expansion of the sleeve 16 forces the workpiece into intimate contact with the polished working surfaces of the annular die 11. In the actual operation of a commercial machine, it is usual to build up an initial pressure of about 2,000 pounds p.s.i. and to hold the same for a short period sufficient to allow full forming movement of the workpiece. Thereafter an abrupt shock-like pressure of 5,000 pounds p.s.i. is applied to set the metal of the workpiece in uniform or intimate and continuous contact with the polished forming surfaces of the die to obtain accuracy in the product and substantial absence of any springback upon removal of the pressure. As the pressure is initially built up in the sleeve 16, the latter expands radially outward and if stretching thereof is to be kept within reasonable limits it is desirable to shorten the sleeve in an axial direction. This is provided for by allowing the interconnected piston parts 29 and 30 to slide inwardly against the yielding force of the spring 33, it being observed that the piston parts 15 and 30 are accurately interfitted at surface 32' and provided with a sealing O-ring, as shown.

Upon completion of the forming phase and after the application of the extremely high forging pressure above mentioned pressure is reduced in the conduit 33 substantially down to an atmospheric value and during this time the spring 33a lengthens out to restretch the sleeve 16 substantially to its uniform cylindrical shape shown in the drawing. This permits all the excess oil in the sleeve to pass out through the conduit 33 and at this time the breach ring 25 may be unlocked and the rod 18 raised to withdraw the expanding mechanism from the die preparatory to insertion of a new workpiece and the withdrawal of the formed workpiece, all in a possible manner disclosed in the above mentioned copending application. During the initial vertically upward retractive movement of the rod 18 and consequently of the ring 37, the ring 34 will follow along until its upper conical seating surface engages the conical sealing surface on the disk 38 which is attached to the upper end of the fitting 32. This closes off completely the upper end of the passage through conduit 33 so that upon subsequent and further retraction of the expanding mechanism no air or other contaminant will enter the passage and the passage will be kept filled with oil by the continued application of a small positive pressure to the same through the conduit 33. During such subsequent and further retraction the disk 39 will continue for a short time to lie in contact with the disk 38 (due to the sliding action of disk 39 on the bottom end of rod 18 and the expansive action of the springs shown). Shortly, the conical seating surface of the ring 37 will engage the conical sealing surface of the disk 39 and thereafter all the oil will be sealed within the expandable sleeve 16 and will so remain there during full retraction of the expanding mechanism from the die 11 and die retainer 10. It should be noted that this valving shut is accomplished without any possibility whatever of any air or other contaminant entering the space within the sleeve 16. The oil remains locked in the sleeve during such full retraction of the expander and swinging or lateral movement of the same away from the axis of the die and retainer to permit interchange of the workpieces. At the start of a new cycle and with the expander being lowered into a new workpiece, the flat seating surface on the bottom of ring 37 first engages the top flat sealing surface of the ring 34 and a seal is effected between these surfaces before the seal is broken between ring 34 and disk 38. Upon further descent disk 39 contacts disk 38 and thereafter an annular passage is formed between disk 39 and ring 37 to arrive at the condition of the valve shown in the drawing preparatory to the next cycling inflow of pressure and expansion-forming of the workpiece. The valve arrangement, again, avoids inflow of air or leakage of hydraulic pressuring fluid and as a consequence the operation of the machine may progress from one cycle to the next at a high rate of production. It will be understood that in a commercial embodiment of the apparatus automatic sequence controls, not included herein, will be provided to control the pressure of flow of hydraulic actuating fluid in the conduit 33, the locking and unlocking of the breach ring 25 and the manipulation of the supporting rod 18. Other mechanism, as disclosed in the above-mentioned copending application, may be used to load and unload the workpiece in properly interlaced relation with the sequence of actuation of the components shown in the present application.

Having thus described my invention what I claim is:

1. Apparatus for forming a cylindrical or tubular sheet metal object by the expansion thereof comprising an annular forming die which is open at one of its axial ends for the axial movement therethrough of a workpiece in loading and unloading, and an expanding mechanism movable axially into and out of the workpiece when the latter is in the die, said mechanism comprising a piston-like carrier comprising two piston-like telescoping members and a radially expandable and stretchable sleeve closely surrounding said members and attached at its ends to the extremities of said members, and said carrier having fluid passages at the other of said axial ends of said forming die for the ingress and egress of pressuring fluid to the inner surface of the sleeve whereby the sleeve may be expanded into contact with the inner surface of the workpiece and the workpiece thus expanded into intimate and continuous contact with the inner forming surfaces of the die and yielding means within said carrier to forcibly bias said telescopic members apart whereby said sleeve is stretched to an axially straight condition after completion of a forming cycle and the subsequent release of fluid pressure from the space within said sleeve.

2. Apparatus according to claim 1 further characterized in that said annular die is received within a heavy retainer, said retainer having an annular bore of larger dimension than the maximum internal diameter of the die extending outwardly of the open end of said die, a cap carried with said carrier and receivable in said bore, and a rotatable breach lock rotatably mounted on said cap and having discontinuous threads on its outer periphery for engaging with discontinuous threads formed in the side wall of the bore whereby said cap and attached carrier may be releasably locked in said retainer and die.

3. Apparatus according to claim 1 wherein one of said members is formed of two axially separable parts to clampingly receive therebetween an integral bead on one end of said sleeve, a ring separably attached to the other end of said carrier and said other end as well as said ring to clampingly receive therebetween a bead formed integrally on the other end of said sleeve.

4. Apparatus according to claim 1 further including means providing a fluid passage extending axially through said other end of said die and leading into the space within said sleeve when said carrier is bottomed in the die to permit the ingress and egress of fluid under pressure into and out of said space during a cycle of operation of the apparatus, and further including automatically operative valve means to close said passage at two axial spaced points upon retraction of said carrier from said die, the outermost of said valving points being operative to seal fluid in the fixed conduit means forming said passage and the innermost of said valving points being operative to seal fluid in the space within said sleeve.

5. Apparatus according to claim 1 further including an axial extending fluid conduit normally fixed in the other end of said die to conduct and carry away fluid from said passages and having a castellated inner end, an annular valving ring rigidly mounted on the axle end of said carrier adjacent said conduit and having an axial outward seating surface as well as an axial inward seating surface, a second ring slideably mounted on said conduit and having an upper sealing surface to engage the outward seating surface of said first-mentioned ring, means biasing said second ring into pressure contact with said first-mentioned ring, a first disk rigidly connected to and closing off the castellated end of said conduit but having a radially outward sealing flange arranged to be engaged by an annular surface of said second-mentioned ring upon retraction of said carrier and first-mentioned ring which permits axial movement of said second-mentioned ring, and a second disk carried by and slideable axially with respect to said carrier and adapted to have sealing contact with the inner seating surface of said first-mentioned ring, said second disk being spring biased axially outward of said carrier and adapted to have abutting contact with said first disk, the arrangement being such that upon retraction of said carrier and first-mentioned ring the seal remains between said first-mentioned ring and said second-mentioned ring after which seals are established between said second-mentioned ring and said first disk and between said first-mentioned ring and said second disk whereby all air is excluded from the passages while the actuating fluid is locked in the conduit and in said carrier within said sleeve.

6. Apparatus according to claim 5 further including conical interengaging surfaces between said first and second-mentioned rings to automatically align the valving seal between said first disk and said second-mentioned ring upon movement of said expanding mechanism into operative position.

7. Apparatus according to claim 5 further characterized in that said inner seating surface of said first-mentioned ring and the outwardly flanged sealing surface of said second disk are parallel to each other but conically related with respect to the longitudinal axis of said expanding mechanism whereby upon retraction of said mechanism from its operative position the valving seal between said first-mentioned ring and said second disk will be automatically centered.

References Cited

UNITED STATES PATENTS

| | | | |
|---|---|---|---|
| 1,162,354 | 11/1915 | Hart | 339—199 |
| 2,696,184 | 12/1954 | Demarest | 72—63 |
| 2,742,622 | 4/1956 | Stevens | 339—199 |
| 2,787,973 | 4/1957 | Heidmann | 72—63 |
| 2,821,945 | 2/1958 | Peccerill | 72—63 |

CHARLES W. LANHAM, *Primary Examiner.*

K. C. DECKER, *Assistant Examiner.*